United States Patent
Khan et al.

(10) Patent No.: US 9,516,623 B2
(45) Date of Patent: Dec. 6, 2016

(54) ENABLING CDMA2000 SYSTEM SHARING IN LTE

(71) Applicant: Nokia Solutions and Networks Oy, Espoo (FI)

(72) Inventors: Javed Khan, Chandler, AZ (US); Sean Kelley, Hoffman Estates, IL (US); Christopher Schmidt, Pinole, CA (US)

(73) Assignee: Nokia Solutions and Networks Oy, Espoo (FI)

(*) Notice: Subject to any disclaimer, the term of this patent is extended or adjusted under 35 U.S.C. 154(b) by 120 days.

(21) Appl. No.: 13/836,818

(22) Filed: Mar. 15, 2013

(65) Prior Publication Data

US 2013/0259006 A1 Oct. 3, 2013

Related U.S. Application Data

(60) Provisional application No. 61/616,355, filed on Mar. 27, 2012.

(51) Int. Cl.
*H04B 7/216* (2006.01)
*H04W 72/02* (2009.01)
*H04W 36/00* (2009.01)
(Continued)

(52) U.S. Cl.
CPC ......... *H04W 72/02* (2013.01); *H04W 36/0022* (2013.01); *H04W 48/16* (2013.01); *H04W 48/18* (2013.01)

(58) Field of Classification Search
CPC .................................................... H04W 72/02
USPC ................................................. 370/310–350
See application file for complete search history.

(56) References Cited

U.S. PATENT DOCUMENTS 9,220,055 B2 * 12/2015 Shin ..................... H04W 48/16
2011/0080867 A1 * 4/2011 Mildh ........................ 370/328
2012/0028661 A1   2/2012 Fang et al. ................. 455/466
(Continued)

FOREIGN PATENT DOCUMENTS

EP    2056639 A2   5/2009
RU    2434366 C2   11/2011
(Continued)

OTHER PUBLICATIONS

3GPP TSG-RAN2 Meeting #77; R2-121002; Nokia Siemens Networks, et al.; "CR to 36.331 on cdma2000 band classes and references"; Dresden, Germany, Feb. 6-10, 2012 (11 pages).

(Continued)

*Primary Examiner* — Ricky Ngo
*Assistant Examiner* — Wei-Po Kao
(74) *Attorney, Agent, or Firm* — Harrington & Smith

(57) ABSTRACT

A method at a user equipment in an LTE system includes selecting one of a number of CDMA systems, and signaling indication(s) of the selected CDMA system to a network element. The network element receives indication(s) of CDMA system(s), which correspond to requested action(s) by a UE. The network element routes information corresponding to the requested action(s) to the CDMA system(s). Another network element in the LTE system signals to the UE indications of a mapping of a number of CDMA systems to associated ones of LTE system(s). The other network element receives signaling from the UE including indication(s) of selected CDMA system(s) selected by the UE.

18 Claims, 8 Drawing Sheets

(51) Int. Cl.
  *H04W 48/16* (2009.01)
  *H04W 48/18* (2009.01)

(56) References Cited

U.S. PATENT DOCUMENTS

2012/0063412 A1  3/2012  Kiyoshima et al. .......... 370/330
2012/0063414 A1* 3/2012  Ramachandran ............. 370/331
2015/0063296 A1* 3/2015  Noma et al. .................. 370/331

FOREIGN PATENT DOCUMENTS

WO  WO 2009/142581 A1  11/2009
WO  WO 2010/132710 A1  11/2009

OTHER PUBLICATIONS

3GPP TS 23.216 v11.4.0 (Mar. 2012); 3rd Generation Partnership Project; Technical Specification Group Services and System Aspects; Single Radio Voice Call Continuit (SRVCC); Stage 2; Release 11 (64 pages).

3GPP TS 29.276 v10.3.0 (Dec. 2011); 3rd Generation Partnership Project; Technical Specification Group Core Network and Terminals; 3GPP Evolved Packet System (EPS); Optimized Handover Procedures and Protocols between E-UTRAN access and cdma2000 HRPD Access; Stage 3; Release 10 (21 pages).

3GPP TS 23.272 V11.0.0; "3$^{rd}$ Generation Partnership Project; Technical Specification Group Services and System Aspects; Circuit Switched (CS) fallback in Evolved Packet System (EPS); Stage 2 (Release 11)": Mar. 2012; whole document.

3GPP TS 23.402 V11.2.0; "3$^{rd}$ Generation Partnership Project; Technical Specification Group Services and System Aspects; Architecture enhancements for non-3GPP accesses (Release 11)": Mar. 2012; whole document.

3GPP TS 23,216 V9.3.0; "3$^{rd}$ Generation Partnership Project: Technical Specification Group Services and System Aspects; Single Radio Voice Call Continuity (SRVCC); Stage 2 (Release 9)"; Mar. 2010: whole document.

3GPP TS 36.413 V10,5.0; "3$^{rd}$ Generation Partnership Project; Technical Specification Group Radio Access Network; Evolved Universal Terrestrial Radio Access Network (E-UTRAN); S1 Application Protocol (S1AP) (Release 10)"; Mar. 2012; whole document.

3GPP TS 29.277 V10.0.0; "3$^{rd}$ Generation Partnership Project; Technical Specification Group Core Network and Terminals; Optimised Handover Procedures and Protocol between EUTRAN access and non-3GPP accesses (S102); Stage 3 (Release 10)"; Mar. 2011; whole document.

3GPP TS 29.276 V9.4.0; "3$^{rd}$ Generation Partnership Project; Technical Specification Group Core Network and Terminals; 3GPP Evolved Packet System (EPS); Optimized Handover Procedures and Protocols between E-UTRAN access and cdina2000 HRPD Access; Stage 3 (Release 9)"; Sep. 2010; whole document.

NEC Corporation; 3GPP TSG RAN2 Meeting #77bis, R2-121577; "CDMA2000 interworking in shared RAN"; Mar. 26-30, 2012; Jeju, South Korea; whole document.

Alcatel-Lucent, Clearwire; 3GPP TSG RAN WG2 #77bis, R2-121695; "CDMA inter-working in LTE shared networks"; Mar. 26-30, 2012; Jeju, Korea; whole document.

3GPP TS 24.301 V11.2.1; "3$^{rd}$ Generation Partnership Project; Technical Specification Group Core Network and Terminals; Non-Access-Stratum (NAS) protocol for Evolved Packet System (EPS); Stage 3 (Release 11)"; Mar. 2012; whole document.

3GPP TS 36.331 V10.5.0; "3$^{rd}$ Generation Partnership Project; Technical Specification Group Radio Access Network; Evolved Universal Terrestrial Radio Access (E-UTRA); Radio Resource Control (RRC); Protocol specification (Release 10)"; Mar. 2012; whole document.

* cited by examiner

ENABLING CDMA2000 SYSTEM SHARING IN LTE

CROSS-REFERENCE TO RELATED APPLICATIONS

The present application claims the benefit under 35 U.S.C. §119(e) of U.S. Provisional Patent Application No. 61/616,355, filed on Mar. 27, 2012, the disclosure of which is hereby incorporated by reference in its entirety.

TECHNICAL FIELD

This invention relates generally to wireless communications and, more specifically, relates to a UE under an LTE system selecting, from a number of possible CDMA2000 systems, a CDMA2000 system (s) for handover and fallback service, and signaling the selected CDMA2000 system(s) to the LTE system, so that handover and fallback service to the CDMA system(s) can be effected.

BACKGROUND

This section is intended to provide a background or context to the invention disclosed below. The description herein may include concepts that could be pursued, but are not necessarily ones that have been previously conceived, implemented or described. Therefore, unless otherwise explicitly indicated herein, what is described in this section is not prior art to the description in this application and is not admitted to be prior art by inclusion in this section.

The following abbreviations that may be found in the specification and/or the drawing figures are defined as follows:

1xRTT 1x Radio Transmission Technology (a CDMA2000 technology)
3GPP Third Generation Partnership Project
CDMA Code Division Multiple Access
CDMA2000 Code Division Multiple Access 2000
CS Circuit Switched
CSFB Circuit Switched FallBack
eNodeB or eNB E-UTRAN (or evolved) NodeB (LTE base station)
EPC Evolved Packet Core
E-UTRAN Evolved UTRAN
HRPD High Rate Packet Data (a CDMA2000 technology)
eHRPD evolved HRPD (a CDMA2000 technology)
ID IDentification
IWS InterWorking Solution
LTE Long Term Evolution
MME Mobility Management Entity
NAS Non Access Stratum
NID Network IDentity
PLMN Public Land Mobile Network
PRL Preferred Roaming List
RAN Radio Access Network
RAT Radio Access Technology
RRC Radio Resource Control
S1AP S1 Application Part
SIB1 System Information Block type1
SIB8 System Information Block type8
SID System IDentity (or System IDentifier)
SRVCC Single Radio Voice Call Continuity
TS Technical Standard
UE User Equipment
UTRAN Universal Terrestrial Radio Access Network
VoIP Voice Over Internet Protocol Current LTE specifications only support interworking (e.g., Handover, CSFB, SRVCC procedures) between a single LTE system and a single CDMA2000 system of each type (1xRTT and eHRPD). There is a need to support interworking between a single LTE system and multiple CDMA2000 systems of the same type, to accommodate cases where one LTE system has overlapping radio coverage with multiple CDMA2000 systems of the same type.

BRIEF SUMMARY

This section is intended to provide an overview of the exemplary embodiments, and is not intended to be limiting.

In an exemplary embodiment, a method is disclosed that includes selecting, at a user equipment in a long term evolution system, one of a plurality of code division multiple access systems. The method also includes signaling one or more indications of the selected code division multiple access system to a network element.

An additional exemplary embodiment includes a computer program, comprising: code for selecting, at a user equipment in a long term evolution system, one of a plurality of code division multiple access systems; and code for signaling one or more indications of the selected code division multiple access system to a network element, when the computer program is run on a processor. A further exemplary embodiment is a computer program according to this paragraph, wherein the computer program is a computer program product comprising a computer-readable medium bearing computer program code embodied therein for use with a computer.

An exemplary apparatus includes one or more processors and one or move memories including computer program code. The one or more memories and the computer program code tire configured to, with the one or more processors, cause the apparatus to perform at least the following: selecting, at a user equipment in a long term evolution system, one of a plurality of code division multiple access systems; and signaling one or more indications of the selected code division multiple access system to a network element. A user equipment may comprise the apparatus of this paragraph.

A further exemplary embodiment is an apparatus that comprises means for selecting, at a user equipment in a long term evolution system, one of a plurality of code division multiple access systems; and means for signaling one or more indications of the selected code division multiple access system to a network element. A user equipment may comprise the apparatus of this paragraph.

Another exemplary embodiment is a method. The method, comprises receiving at a network element in a long term evolution system one or more indications of one or more selected ones of a plurality of code division multiple access systems to which the network element has access, the one or more selected code division multiple access systems corresponding to one or more requested actions by a user equipment and selection by the user equipment of the selected ones of the plurality of code division, multiple access systems. The method also comprises routing information corresponding to the one or more requested actions to the one or more selected code division multiple access systems.

An additional, exemplary embodiment includes a computer program, comprising: code for receiving at a network element in a long term evolution system one or more indications of one or more selected ones of a plurality of code division multiple access systems to which the network element has access, the one or more selected code division multiple access systems corresponding to one or more requested actions by a user equipment and selection by the user equipment of the selected ones of the plurality of code division multiple access systems; and code for routing information corresponding to the one or more requested actions to the one or more selected code division multiple access systems, when the computer program is run on a processor. An additional exemplary embodiment is a computer program according to this paragraph, wherein the computer program is a computer program product comprising a computer-readable medium bearing computer program code embodied therein for use with a computer.

An exemplary apparatus includes one or more processors and one or more memories including computer program code. The one or more memories and the computer program code are configured to, with the one or more processors, cause the apparatus to perform at least the following: receiving at a network element in a long term evolution system one or more indications of one or more selected ones of a plurality of code division multiple access systems to which the network element has access, the one or more selected code division multiple access systems corresponding to one or more requested actions by a user equipment and selection by the user equipment of the selected ones of the plurality of code division multiple access systems; and routing information corresponding to the one or more requested actions to the one or more selected code division multiple access systems. A mobility management entity may comprise the apparatus of this paragraph.

A further exemplary embodiment is an apparatus comprising: means for receiving at a network element in a long term evolution system one or more indications of one or more selected ones of a plurality of code division multiple access systems to which the network element has access, the one or more selected code division multiple access systems corresponding to one or more requested actions by a user equipment and selection by the user equipment of the selected ones of the plurality of code division multiple access systems; and means for routing information corresponding to the one or more requested actions to the one or more selected code division multiple access systems. A mobility management entity may comprise the apparatus of this paragraph.

Another exemplary method is disclosed. This method includes signaling, at a network element in a long term evolution system, to a user equipment indications of a mapping of a plurality of code division multiple access systems to associated ones of one or more long term evolution systems; and receiving signaling from the user equipment comprising one or more indications of one or more selected code division multiple access systems selected by the user equipment.

A further exemplary embodiment includes a computer program, comprising: code for signaling, at a network element in a long term evolution system, to a user equipment indications of a mapping of a plurality of code division multiple access systems to associated ones of one or more long term evolution systems; and code for receiving signaling from the user equipment comprising one or more indications of one or more selected code division multiple access systems selected by the user equipment, when the computer program is run on a processor. Another exemplary embodiment is the computer program, according to this paragraph, wherein the computer program is a computer program, product comprising a computer-readable medium bearing computer program code embodied therein for use with a computer.

An exemplary apparatus includes one or more processors and one or more memories including computer program code. The one or more memories and the computer program code are configured to, with the one or more processors, cause the apparatus to perform at least the following: signaling, at a network element in a long term evolution system, to a user equipment indications of a mapping of a plurality of code division multiple access systems to associated ones of one or more long term evolution systems; and receiving signaling from the user equipment comprising one or more indications of one or more selected code division multiple access systems selected by the user equipment. A base station may comprise the apparatus of this paragraph.

In another exemplary embodiment, an apparatus is disclosed that comprises: signaling, at a network element in a long term evolution system, to a user equipment indications of a mapping of a plurality of code division multiple access systems to associated ones of one or more long term evolution systems; and receiving signaling from the user equipment comprising one or more indications of one or more selected code division multiple access systems selected by the user equipment. A base station may comprise the apparatus of this paragraph.

BRIEF DESCRIPTION OF THE DRAWINGS

In the attached Drawing Figures:

FIG. 4, including

DETAILED DESCRIPTION OF THE DRAWINGS

Figure 1:
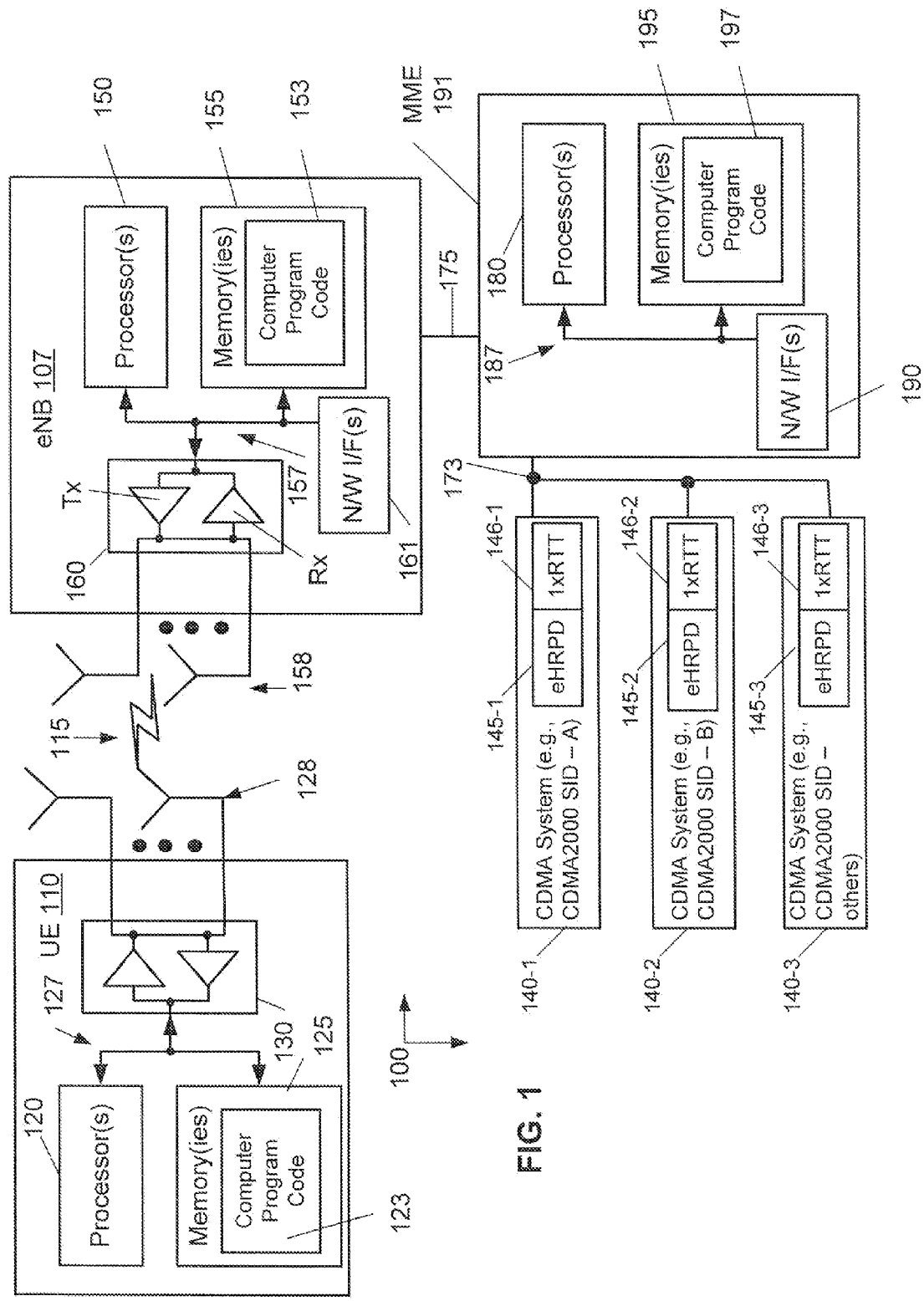
FIG. 1 illustrates an exemplary system in which the exemplary embodiments of the instant invention may be practiced.

Before proceeding with additional description regarding enabling interworking between an LTE system and multiple CDMA2000 systems of the same type, reference is made to FIG. 1, which illustrates an exemplary system in which the exemplary embodiments of the instant invention may be practiced. In FIG. 1, a user equipment (UE) 110 may be in wireless communication with a network 100 via a wireless link 115 with eNB 107, e.g., an LTE RAN. The exemplary embodiments of the invention concern how connection(s) the UE has with the LTE eNB 107 and corresponding LTE system are routed to one of the CDMA2000 systems 140.

The user equipment 110 includes one or more processors 120, one or more memories 125, and one or more transceivers 130 (comprising a receiver, Rx, and transmitter, Tx) interconnected through one or more buses 127. The one or more transceivers 130 are connected to one or more antennas 128. The one or more memories 125 include computer program code 123. The one or more memories 125 and the computer program code 123 are configured to, with the one or more processors 120, cause in an exemplary embodiment the user equipment 110 to perform one or more of the operations as described herein.

The network 100 includes eNB (eNode B, an LTE base station) 107, MME 191, and multiple CDMA2000 systems 140. In this example, three CDMA2000 systems 140 are shown. Each CDMA2000 system 140 includes a corresponding eHRPD system (e.g., RAN) 145 and 1xRTT system (e.g., RAN) 146. It is noted that although each CDMA2000 system 140 is represented in FIG. 1 with both eHRPD systems 145 and 1xRTT systems 146, each CDMA2000 system 140 could have only an eHRPD system 145, only a 1xRTT system 146, or both an eHRPD system 145 and a 1xRTT system 146. The eNodeB 107 includes one or more processors 150, one or more memories 155, one or more network interfaces (N/W I/F(s)) 161, and one or more transceivers 160 (each comprising a transmitter, Tx, and a receiver, Rx) interconnected through one or more buses 157. The one or more transceivers 160 are connected to one or more antennas 158. The one or more memories 155 include computer program code 153. The one or more memories 155 and the computer program code 153 are configured to, with the one or more processors 150, cause in an exemplary embodiment the eNodeB 107 to perform one or more of the operations as described herein. The one or more network interfaces 161 communicate over networks such as the network 175.

The MME 191 includes one or more processors 180, one or more memories 195, and one or more network interfaces (N/W I/F(s)) 190 interconnected through one or more buses 187. The one or more memories 195 include computer program code 197. The one or more memories 195 and the computer program code 197 are configured to, with the one or more processors 180, cause in an exemplary embodiment the MME 191 to perform one or more of the operations as described herein. The one or more network interfaces 190 communicate over networks such as the networks 173, 175.

The eNodeB (eNB) 107 and the MME 191 communicate using, e.g., network 175. The network 175 may be wired or wireless or both and may implement, e.g., an S1-MME interface, e.g., using an S1AP protocol (see, e.g., 3GPP TS 36.413). The MME uses the network 173 to communicate with the CDMA2000 systems 140. The network 173 may be wired or wireless or both and may implement, e.g., an S102 interface, per 3GPP TS 29.277 for 1xRTT and an S101 interface per 3GPP TS29.276 for eHRPD.

An E-UTRAN system includes the eNB 107 (e.g., an LTE RAN) and the MME 191. An E-UTRAN system may overlay one or more CDMA2000 systems 140. It is noted that E-UTRAN and CDMA2000 systems typically include several to many more elements than are shown in FIG. 1. For instance, a CDMA2000 1x system may include a BSC, an MSC, an MGW, and an HLR. A CDMA2000 eHRPD system may include a PCF, an AN-AAA, and an HSGW. An E-UTRAN system may also include an SGW (serving gateway), a PDN-GW (packet data network-gateway), a PCRF (policy control and charging rules function), and an HSS (home subscriber server). For each of these systems, there is a core network and a RAN. For instance, LTE has a RAN (e.g., eNB 107) and an EPC including the MME 191. For simplicity, FIG. 1 only shows the prominent elements of these systems that are mainly discussed herein.

The computer readable memories 125, 155, and 195 may be of any type suitable to the local technical environment and may be implemented using any suitable data storage technology, such as semiconductor based memory devices, flash memory, magnetic memory devices and systems, optical memory devices and systems, fixed memory and removable memory. The processors 120, 150, and 180 may be of any type suitable, to the local technical environment, and may include one or more of general purpose computers, special purpose computers, microprocessors, digital signal processors (DSPs) and processors based on a multi-core processor architecture, as non-limiting examples.

In general, the various embodiments of the UE 110 can include, but are not limited to, cellular mobile devices, smartphones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The three CDMA2000 systems 140 can provide, e.g., 1xRTT and eHRPD services (e.g., via corresponding 1xRTT systems 146 and eHRPD systems 145) to the UE 110. Each CDMA2000 system 140 can correspond to a System Identifier (SID) (or network identifier, NID). Further, it should be noted that an eHRPD system 145 is identified by its "subnet". The operator may use the SID of the corresponding 1xRTT network to create the "subnet" identifier. However, it is not mandatory for the operator to use SID for creating the subnet identifier. The instant disclosure uses the generic term "system identifier" for both the subnet and the SID. As described above, current LTE specifications only support interworking (e.g., handover, CSFB, SRVCC procedures) between a single LTE system and a single CDMA2000 system of each type (1xRTT and eHRPD). Thus, there is a need to support interworking between a single LTE system and multiple CDMA2000 systems (e.g., CDMA2000 system sharing) where the LTE system has overlapping coverage area with the multiple CDMA2000 systems. An EPC can support connectivity to multiple 1xRTT systems 146 (e.g., via multiple IWS) belonging to multiple operators. When a subscriber attaches to an LTE network, the UE will select an appropriate, e.g., 1xRTT network with which the UE will perform preregistration procedures. The UE uses, e.g., CDMA2000 procedures to select a 1xRTT network (typically using a PRL). The Extended Service Request procedure, which is used for initiating a CSFB procedure, needs to be enhanced to allow the UE to indicate the selected 1xRTT system identifier. This 1xRTT System Identifier is provided to the eNodeB by the MME and allows the eNodeB to use appropriate 1xRTT system specific parameters, measurement configuration and 1xRTT cell selection to handover the UE to the selected 1xRTT system. Therefore, the exemplary embodiments herein allow a UE to select from multiple CDMA systems 140. It is noted that the term 'RAN' may be inferred to mean multiple RANs in the same system, which is what is supported today. Exemplary embodiments herein provide an interface to multiple CDMA2000 systems, each with a unique 'system id'. But at the same time, there can be multiple interfaces to multiple CDMA2000 RANs with the same 'system id'.

Exemplary embodiments of the instant invention additionally may provide the following. In an exemplary embodiment, an eNB 307 provides a mapping of 1xRTT and eHRPD systems to LTE PLMN in, e.g., an overhead signaling message. In another exemplary embodiment, a UE 110 uses the mapping and indicates a selected CDMA2000 System Identifier (SID) for 1xRTT and eHRPD to the E-UTRAN eNodeB in, e.g., RRC signaling messages. In a further exemplary embodiment, an E-UTRAN eNodeB 107 indicates CDMA2000 System Identifiers in, e.g., S1AP signaling messages to the MME 191. In an another exemplary embodiment, the MME 191 indicates a selected CDMA2000 System Identifier in signaling messages to the eNodeB 107 for 1x Circuit Switched Fallback procedures. The E-UTRAN eNodeB 107 may indicate a CDMA2000 System Identifier in handover signaling messages to the MME 191 for 1xRTT CS Fallback, handover to eHRPD, and for SRVCC procedures.

In a more specific exemplary embodiment, the eNodeB 107 broadcasts a mapping of 1xRTT/HRPD systems to LTE PLMNs in an overhead signaling message. A UE 110 selects a serving CDMA2000 system (e.g., SID/NID for 1xRTT and eHRPD) using information of multiple CDMA2000 systems broadcast in E-UTRAN and indicates the selected CDMA2000 System Identifiers in signaling messages to the eNodeB 107. The eNodeB 107 sends parameters specific to the selected CDMA2000 system to the UE 110. The eNodeB 107 indicates the selected CDMA2000 System Identifiers in signaling messages to the MME 191. The MME 191 uses the selected CDMA2000 System Identifiers and the associated Reference Cell information to route the CDMA2000 signaling messages to appropriate 1xRTT and eHRPD networks (e.g., CDMA2000 systems 140) during registration and handover signaling procedures. The UE 110 provides selected CDMA2000 System Identifiers in 1xRTT CS Fallback signaling messages to the MME 191 and the MME 191 in turn provides the selected CDMA2000 System Identifiers to the eNodeB for CS Fallback procedure.

The instant invention therefore provides, in certain exemplary embodiments, techniques for allowing UEs 110 to indicate their preferred 1xRTT and eHRPD system information to the network 100 (e.g., to or through the eNodeB 107) to allow the EUTRAN and EPC to route, e.g., CDMA2000 signaling messages between the UE and selected CDMA system 140 over LTE signaling tunnels.

Figure 2:
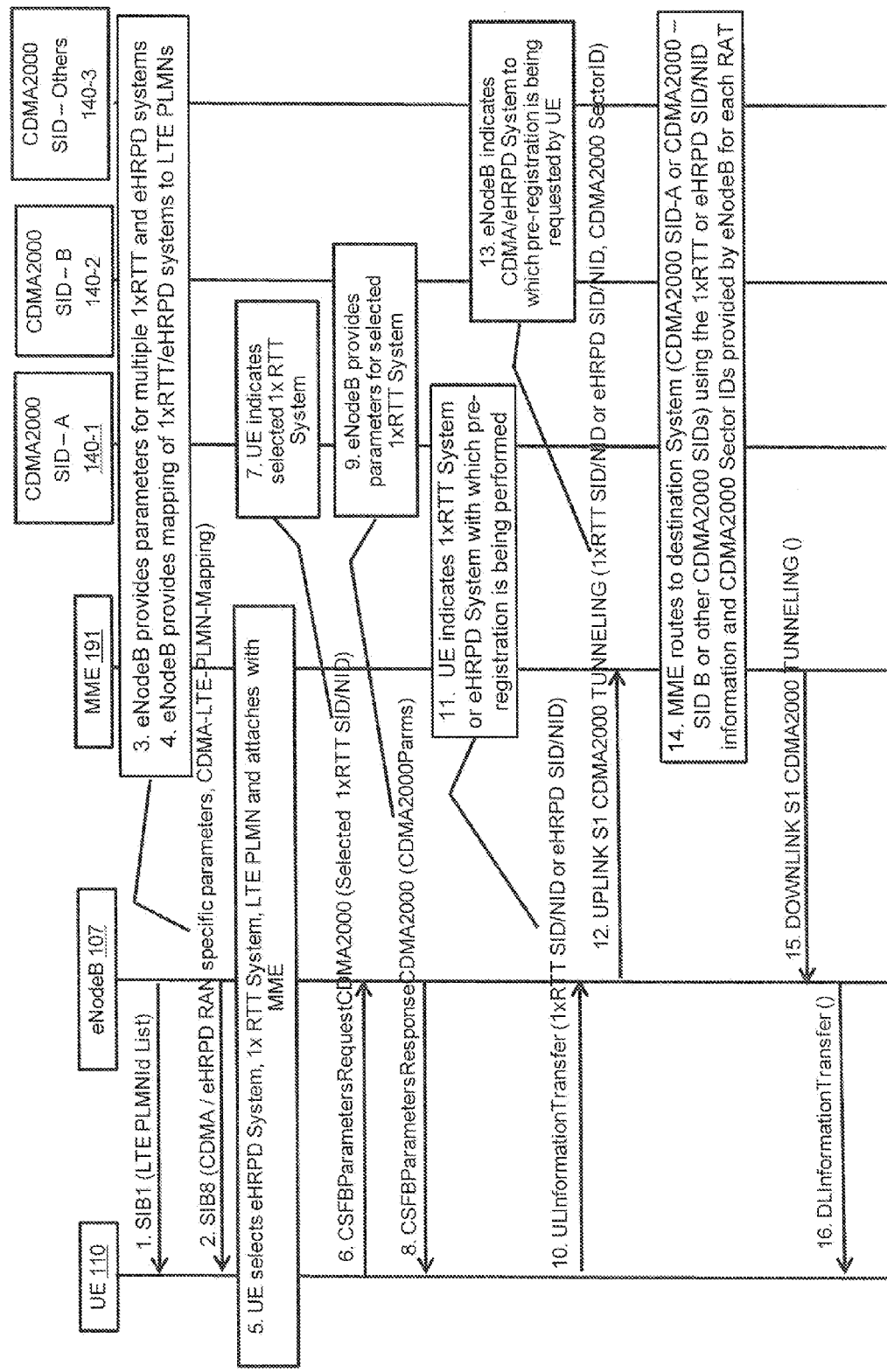
FIG. 2 is an exemplary signaling diagram for 1xRTT/eHRPD pre-registration procedures (see also 3GPP TS 23.272, Figure B.2.1.1-1, and 3GPP TS 23.402, Figure 9.3.1-1)

Turning to FIG. 2, an exemplary signaling diagram for 1xRTT/eHRPD pre-registration procedures (see also 3GPP TS 23.272 and 3GPP TS 23.402) is shown. The preregistration procedure is between a UE and an eHRPD/1xRTT system. The preregistration procedure is, in one sense, an equivalent of the attach procedure (see, e.g., operation 5 below) for 1xRTT/eHRPD. This call, flow is showing preregistration for both 1xRTT and eHRPD. In reality those are two separate independent procedures which use the same LTE signaling. However, the CSFBParametersRequest/CSFBParametersResponse message only applies to preregistration for 1xRTT. There could be two separate call flows (instead of the single one shown) for preregistration for 1xRTT and preregistration for eHRPD. The only difference would be that operations 6, 7, 8, 9 in the call flow of FIG. 2 would only show up for 1xRTT preregistration.

A UE may be capable of three radio access technologies: 1xRTT, eHRPD and LTE. In this case, the UE will preregister separately with 1xRTT and eHPRD after the UE attaches to LTE. CSFB is a procedure used by UE to make 1x voice calls when the UE is attached in LTE. When the UE wants to make a voice call, the UE initiates the Extended Service Request procedure as shown in FIG. 4 to trigger a handover to 1xRTT to make the 1x voice call in 1x. The "circuit switched" is referring to 1xRTT, and the "fallback" is referring to falling back from UE to 1x to make the voice call.

In operation 1 of FIG. 2, the eNodeB 107 signals a SIB1 message including an LTE PLMNId List, containing a list of LTE PLMN IDs. Typically, an LTE PLMN ID is MCC, MNC (Mobile Country Code, Mobile Network Code). So the LTE PLMN ID identifies the network operator. In operation 2, the eNodeB 107 signals a SIB8 message including CDMA/eHRPD RAN specific parameters, and CDMA-LTE-PLMN-Mapping. More specifically, in operation 3, the eNodeB provides parameters for multiple 1xRTT and eHRPD systems (e.g., CDMA systems 140) via the CDMA/eHRPD RAN specific parameters. In operation 4, the eNodeB 107 provides a mapping of 1xRTT/HRPD systems to LTE PLMNs (in the "CDMA-LTE-PLMN-Mapping" of operation 2). Thus, the eNodeB 107 provides a mapping of 1xRTT and eHRPD systems to LTE PLMNs in a SIB8 signaling message. The eNodeB 107 gets the mapping as part of its database configuration, e.g., the LTE system operator provisions the mapping into the eNodeB's database. It is noted that this mapping is provided in each of the FIGS. 2-5, but is only shown in FIG. 2.

Concerning this mapping, it may be the case the eNodeB 107 and the MME 191 are for an LTE PLMN, e.g., LTE PLMN1. The LTE PLMN 1 is therefore mapped to CDMA systems 140-1, 140-2, and 140-3. However, it is also possible that the E-UTRAN is shared among multiple LTE operators. For instance, each LTE operator PLMN1, PLMN2 can share the same EUTRAN (eNodeB) where the EUTRAN can be owned by a separate entity or belong to one of the LTE PLMNs. In this case, the eNodeB broadcasts multiple PLMNs (e.g., IDs thereof) in SIB1. The SIB8 shows a mapping of multiple CDMA2000 systems to multiple LTE PLMNs.

So Operator1 could act as an LTE operator PLMN1 with both an EPC and EUTRAN. Operator1 could partner with another operator such as Operator2 (PLMN2) which may not have any EUTRAN but has an MME/EPC to provide LTE service for Operator2 in addition to Operator1's own LTE service. In this case, Operator1's eNodeBs will broadcast PLMN1 and PLMN2. Additionally, there may be other CDMA2000 operators who do not have LTE equipment who partner with Operator1 or Operator2 to allow CDMA2000 subscribers to attach into PLMN1 or PLMN2 and receive LTE service and to handover to their own CDMA2000 network for 1x voice calls.

Example: Each LTE PLMN1, PLMN2, PLMN3 can be mapped to multiple CDMA system SID1/NID1, SID2/NID2, SID3/NID3, SID 4/NID4 as follows:

SID1/NID1→PLMN1, PLMN3
SID2/NID2→PLMN1, PLMN2, PLMN3
SID3/NID3→PLMN2
SID4/NID4→PLMN1, PLMN2.

In operation 5, the UE 110 selects an eHRPD system, a 1x RTT system, and an LTE PLMN and attaches with the MME 191. The attach procedure (operation 5) is to the MME. It is noted that the 1xRTT and eHRPD systems being selected may be selected from separate CDMA2000 systems 140. In operation 6, the UE provides selected 1xRTT SID/NID information in the CSFBParametersRequestCDMA2000 signaling message to the eNodeB. That is, in operation 7, the UE 110 indicates the selected 1x RTT system to the eNodeB 107. The eNodeB 107, in operation 9, provides CDMA2000 parameters ("CDMA2000Parms") for the selected 1xRTT PLMN in the CSFBParametersResponseCDMA2000 message (operation 8) to the UE.

In operation 10, the UE 110 signals to the eNodeB 107 via an ULInformationTransfer message including one of a 1xRTT SID/NID or an eHRPD SID/NID. The ULInformationTransfer message carries either 1xRTT or eHRPD but not both. So if a 1xRTT preregistration message is carried in this message, a 1xRTT SID/NID is used. If an eHRPD preregistration message is carried in this message, an eHRPD identifier is used (e.g., a subnet). That is, the UE 110 in operation 11 indicates the 1xRTT system or eHRPD system with which pre-registration is being performed. As mentioned earlier, typically an eHRPD "subnet" is used as the eHRPD identifier. Thus, a "SID/NID" for eHRPD would typically be a subnet. However, any system identifier suitable for identifying an eHRPD system may be used. Similarly, although SID/NID is used in the figures for identifying a 1xRTT system, any system identifier suitable for identifying a 1xRTT system may be used. In operation 12, the eNodeB 107 performs UPLINK S1 CDMA2000 TUNNELING signaling and includes the 1xRTT SID/NID or eHRPD SID/NID and the CDMA2000 SectorID. That is, in operation 13, the eNodeB 107 indicates to the MME 191 the CDMA/HRPD system to which pre-registration is being requested by the UE 110.

In operation 14, the MME 191 routes preregistration information to the destination system (CDMA2000 SID-A 140-1, or CDMA2000—SID B 140-2 or other CDMA2000 SIDs 140-3) (and its corresponding system 145/146) using the 1xRTT or eHRPD SID/NID information and CDMA2000 Sector IDs provided by eNodeB for each RAT.

In operation 15, the MME 191 signals via DOWNLINK S1 CDMA2000 TUNNELING message to the eNodeB 107. In operation 16, the eNodeB 107 signals to the UE 110 via the DLInformationTransfer message. These messages carry tunneled 1xRTT/eHRPD preregistration response messages front the corresponding 1xRTT/eHRPD system. These are responses to the preregistration messages sent in operation 12.

Figure 3:
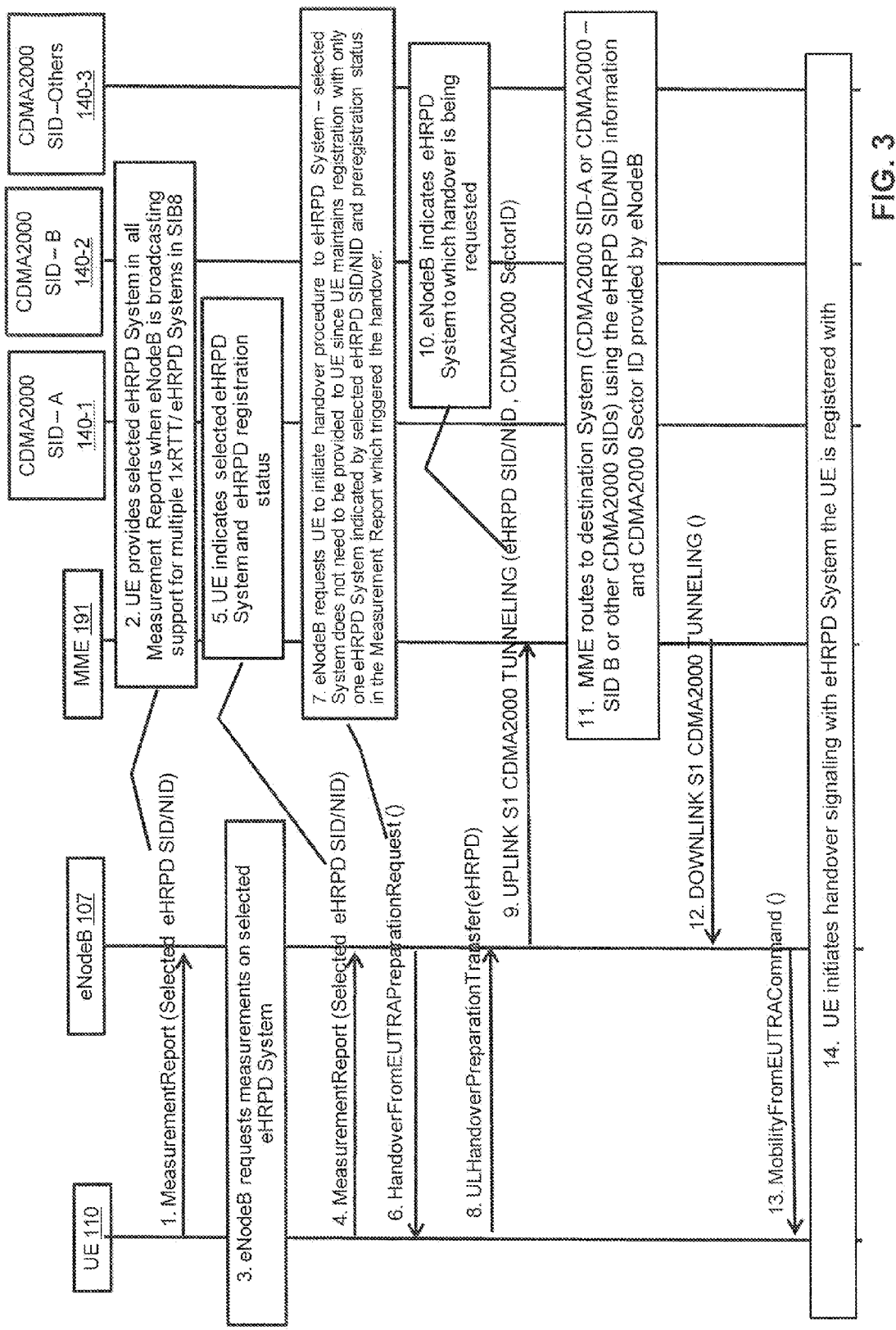
FIG. 3 is an exemplary signaling diagram for handover from an LTE to an eHRPD system (see also 3GPP TS 23.402, Figure 9.3.2-1)

Turning to FIG. 3, an exemplary signaling diagram is shown for handover to an eHRPD system (see also 3GPP TS 23.402). In operation 1, the UE signals a MeasurementReport (e.g., containing a selected eHRPD SID/NID) to the MME 191. That is, the UE 110 in operation 2 provides a selected eHRPD system in all Measurement Reports when the eNodeB 107 is broadcasting support for multiple 1xRTT/eHRPD systems in SIB8 messaging. It is noted that this specific example is related to eHRPD handovers.

In operation 3, the eNodeB 107 requests measurements (from the UE 110) on the selected eHRPD system. In operation 4, the UE 110 signals a MeasurementReport message comprising a selected eHRPD SID/NID. Thus, the UE 110 indicates (operation 5) the selected eHRPD system and eHRPD registration status. When the UE 110 is registered with the eHRPD system 145, then the UE 110 is in effect attached to the eHRPD system 145, i.e., the UE 110 has a session with the eHRPD system 145. The UE 110 is not connected to the eHRPD system via a wireless interface with the eHRPD system 145, but instead is connected to the eHRPD system 145 via the link 115 (and its corresponding interface) and the links 175 and 173 and their corresponding interfaces. In operation 6, the eNodeB 107 signals a HandoverFromEUTRAPreparationRequest ( ) message to the UE 110. That is, the eNodeB 107 in operation 7 requests the UE to initiate a handover procedure to the eHRPD system. The selected system does not need to be provided to the UE 110 since the UE 110 maintains registration with only one eHRPD system indicated by selected eHRPD system identifier (e.g., subnet) and pre registration status in the Measurement Report which triggered the handover.

In operation 8, the UE 110 responds with an ULHandoverPreparationTransfer (HRPD) message. The eNodeB 107 signals in operation 9 an UPLINK S1 CDMA2000 TUNNELING message including the eHRPD SID/NID and a CDMA2000 SectorID. That is, in operation 10, the eNodeB 107 indicates the eHRPD system (via the eHRPD SID/NID) to which handover is being requested.

In operation 11, the MME 191 routes handover information to the destination system (e.g., RAN) (e.g., part of systems CDMA2000 SID-A 140-1, or CDMA2000—SID B 140-2, or other CDMA2000 SIDs 140-3) using the eHRPD SID/NID information and CDMA2000 Sector ID provided by the eNodeB 107. For example, the UE sends an eHRPD message (illustrated by the "eHRPD" in operation 8) to the eHRPD system via the LTE system in the LTE messages. So, the ULHandoverPreparationTransfer message contains an eHRPD message which is sent in operation 9 to the MME 191 and MME 191 then sends the eHRPD message to the eHRPD system in operation 11. In operation 12, the MME 191 signals a DOWNLINK S1 CDMA2000 TUNNELING ( ) message (this message contains the response eHRPD message sent by the eHRPD system to the UE via the MME) to the eNodeB 107. In operation 13, the eNodeB 107 signals a MobilityFromEUTRACommand ( ) message to the HE 110, and in operation 14 the UE initiates handover signaling with eHRPD system 145 the UE is registered with.

Figure 4A:
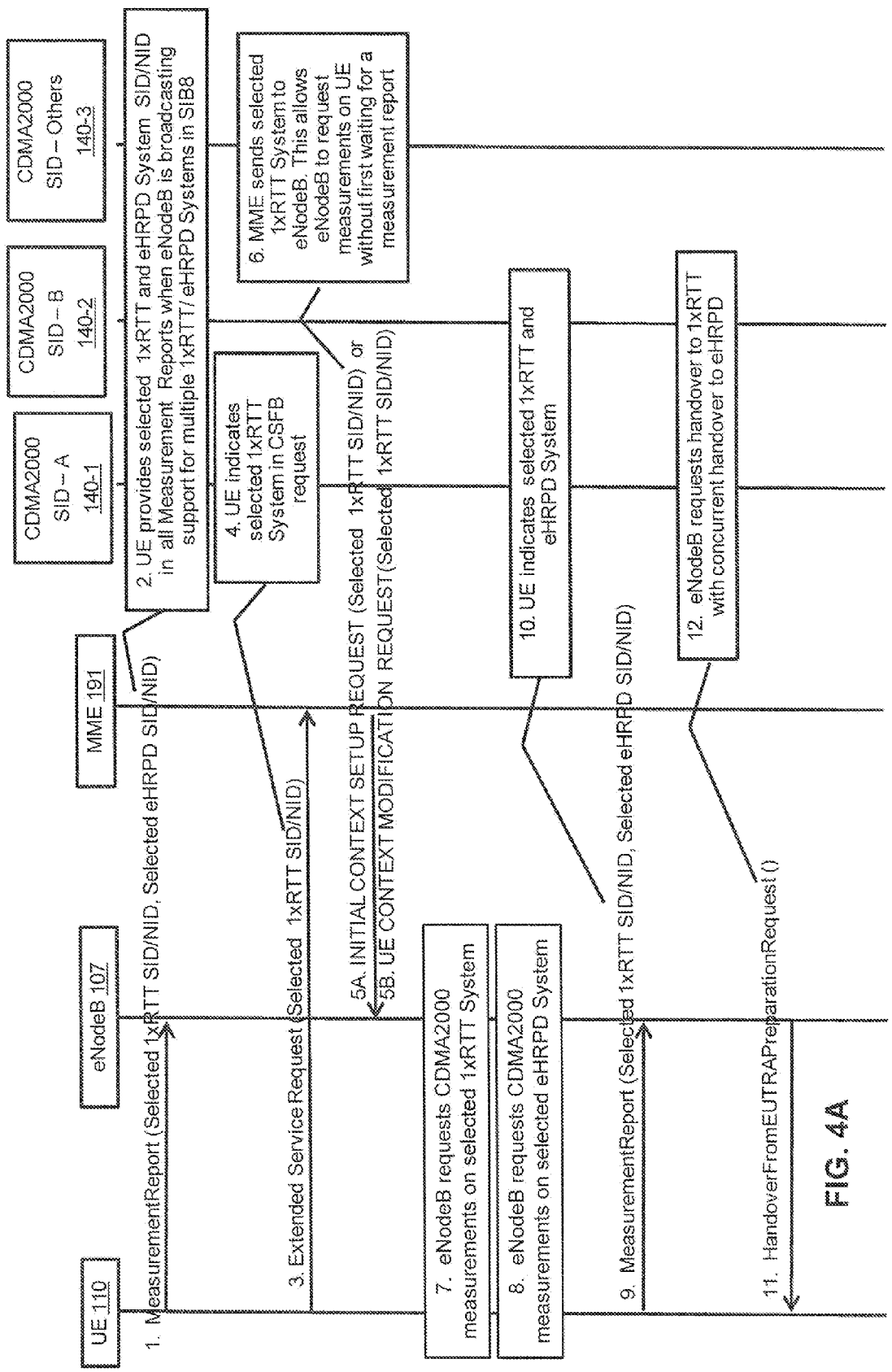
FIGS. 4A and 4B, is an exemplary signaling diagram for 1xCSFB to 1xRTT with concurrent handover to eHRPD (see also 3GPP TS 23.272, Figure B.2.3a.3-1 and Figure B.2.3a.5-1)
Figure 4B:
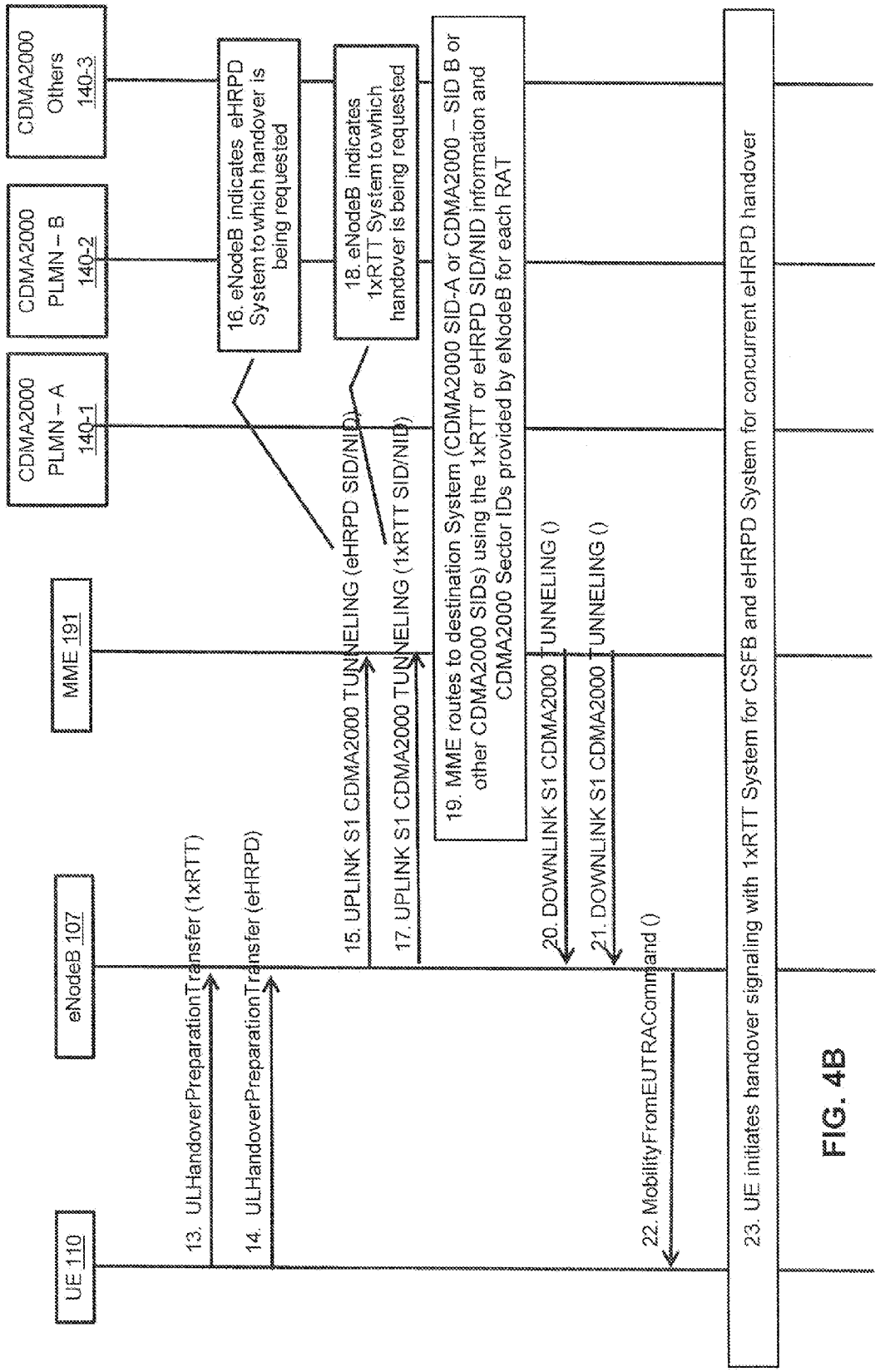

Reference is now made to FIG. 4, including FIGS. 4A and 4B, which is an exemplary signaling diagram for 1xCSFB to 1xRTT with concurrent handover to eHRPD PLMN (see also 3GPP TS 23.272). The CSFB with concurrent handover to eHRPD is a procedure where, when UE makes a voice call, a CSFB procedure is used to handover the UE to 1xRTT for the voice call. At the same time, the UE's LTE packet data session will be transferred to eHRPD—i.e., the packet data service (e.g. web browsing) will be provided by eHRPD. In this case, the LTE packet session will end after the handover to the eHRPD system 145.

The concurrent handover to eHRPD during CSFB is optional. That is, the LTE system may decide to not handover the packet data session eHRPD and retain the session in LTE and only send the UE to 1x for the voice call. In this case, the packet data session remains in LTE and is suspended. When the UE completes the voice call in 1xRTT, the UE will return back to LTE and resume the packet data session (e.g., web browsing) in LTE. FIG. 4 shows the concurrent CSFB/eHRPD handover in the call flow since that was the most complex case.

In this example, the UE 110 signals in operation 1 the MeasurementReport message including a selected 1xRTT SID/NID and a selected eHRPD SID/NID to the eNodeB 107. That is, UE provides (operation 2) selected 1xRTT and eHRPD SID/NID in all measurement reports when the eNodeB 107 is broadcasting support for multiple 1xRTT/eHRPD systems in SIB8 messaging. In this call flow, two cases are being considered, one where the UE is in an Idle mode (see operation 5A below) and another where the UE is in a Connected mode (i.e., has an active connection to the eNodeB 107, see operation 5B below). For Idle mode, operations 1 and 2 are not performed, but operations 1 and 2 could be performed for Connected mode.

In operation 3, the UE 110 signals to the MME 191 (e.g., through the eNodeB 107) an Extended Service Request, message including a selected 1xRTT SID/NID, and thus the UE indicates (operation 4) a selected 1xRTT system in a CSFB request.

The MME 191 performs one of the operations 5A or 5B. In operation 5A, the MME 191 signals to the eNodeB 107 an INITIAL CONTEXT SETUP REQUEST message including the selected 1xRTT SID/NID. The INITIAL CONTEXT SETUP REQUEST message is used when a UE initiated a CSFB procedure while the UE was Idle in LTE. In operation 5B, the MME 191 signals to the eNodeB 107 a UE CONTEXT MODIFICATION REQUEST message including the selected 1xRTT SID/NID. The UE CONTEXT MODIFICATION REQUEST message is used when the UE initiated a CSFB procedure when the UE has an active connection to the eNodeB for LTE service. The MME 191 therefore sends (operation 6) a selected 1xRTT system to the eNodeB 107. This allows the eNodeB 107 to request measurements by the UE 110 without first waiting for a measurement report from the UE 110.

In operation 7, the eNodeB 107 requests CDMA2000 measurements on the selected 1xRTT system (and the UE performs the measurements). In operation 8, the eNodeB 107 requests CDMA2000 measurements on the selected eHRPD system (and the UE performs the measurements). In operation 9, the UE signals MeasurementReports with the selected 1xRTT SID/NID and the selected eHRPD SID/NID (e.g., and measurements for the 1xRTT and eHRPD systems 146, 145, respectively). The UE will send separate Measurement Reports (one with 1xRTT measurements and another with eHRPD measurements). Thus, the UE indicates (operation 10) the selected 1xRTT and eHRPD systems.

In operation 11, the eNodeB 107 signals a HandoverFromEUTRAPreparationRequest ( ) message to the UE 110, and thus the eNodeB requests (operation 12) handover to 1xRTT with concurrent handover to eHRPD. In operation 13, the UE 110 signals an ULHandoverPreparationTransfer message including a 1xRTT message to the eNodeB 107. In operation 14, the UE 110 signals an ULHandoverPreparationTransfer message including an eHRPD message to the eNodeB 107.

In operation 15, the eNodeB 107 signals an UPLINK S1 CDMA2000 TUNNELING message including the eHRPD SID/NID to the MME 191. That is, the eNodeB 107 indicates (operation 16) the eHRPD system 145 to which handover is being requested. In operation 17, the eNodeB 107 signals to the MME 191 an UPLINK S1 CDMA2000 TUNNELING message including the 1xRTT SID/NID. Thus, the eNodeB 107 indicates (operation 18) the 1xRTT system 146 to which handover is being requested.

In operation 19, the MME 191 routes handover information to the destination CDMA2000 system (e.g., part of systems CDMA2000 SID-A 140-1, or CDMA2000—SID B 140-2, or other CDMA2000 SIDs 140-3) using the 1xRTT or eHRPD SID/NID information and CDMA2000 Sector IDs provided by eNodeB for each RAT. The handover information in this example includes the 1xRTT message from operation 13 and the eHRPD message from operation 14. In operation 20, the MME 191 signals a DOWNLINK S1 CDMA2000 TUNNELING ( ) message to the eNodeB 107, and in operation 21, the MME 191 signals a DOWNLINK S1 CDMA2000 TUNNELING ( ) message to the eNodeB 107. These messages contain the corresponding response messages from 1xRTT and eHRPD systems. Illustratively, the UE is requesting a handover to 1xRTT and is simultaneously requesting a handover to eHRPD by tunneling separate request messages to each system. Then, each system (e.g., 145, 146) sends a response message with information that the UE will use to handover each of its stacks—the 1xRTT stack to the 1xRTT system 146 and the eHRPD stack to the eHRPD system 145.

In operation 22, the eNodeB 107 signals a MobilityFromEUTRACommand ( ) to the UE 110. This message contains both the response messages from the 1xRTT and eHRPD systems. So the eNB waits until the eNB receives both the response messages and puts both responses in this message, which triggers the simultaneous handovers to both systems. It should be noted that in this example the eHRPD and 1xRTT systems are independent from each other, which is why the UE sends independent signaling messages to each system. In operation 23, the UE 110 initiates handover signaling with 1xRTT system for CSFB and eHRPD system for concurrent eHRPD handover.

Figure 5:
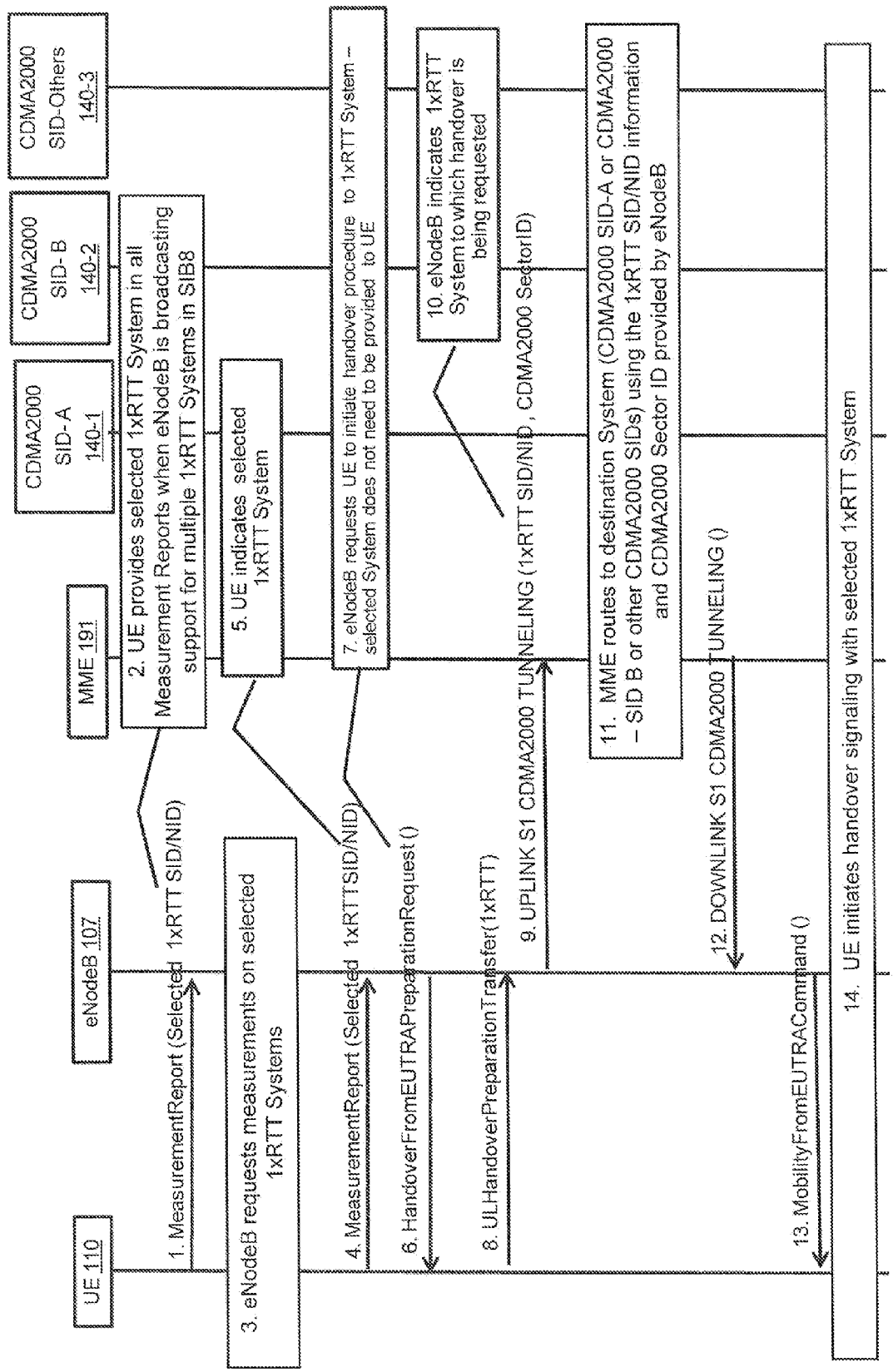
FIG. 5 is an exemplary signaling diagram for SRVCC of VoIP call to a 1xRTT system (see also 3GPP TS 23.216 Figure 6.1.3-1)

Referring now to FIG. 5, an exemplary signaling diagram is shown for SRVCC (single radio voice call continuity) of a VoIP call to 1xRTT PLMN (see also 3GPP TS 23.216). In operation 1, the UE 110 signals a MeasurementReport message comprising a selected 1xRTT SID/NID. Thus, the UE provides (operation 2) a selected 1xRTT system in all measurement reports when the eNodeB 107 is broadcasting support for multiple 1xRTT systems 146 in SIB8 messaging.

In operation 3, the eNodeB 107 requests measurements on the selected 1xRTT systems (and the UE 110 takes the measurements). In operation 4, the UE 110 signals to the eNodeB 107 a MeasurementReport message comprising the selected 1xRTT SID/NID, and therefore the UE 110 indicates (operation 5) a selected 1xRTT system, e.g., via the 1xRTT SID/NID.

In operation 6, the eNodeB 107 responds to the UE 110 with a HandoverFromEUTRAPreparationRequest ( ) message. The eNodeB 107 therefore requests (operation 7) the UE to initiate a handover procedure to the 1xRTT system. The selected system does not need to be provided to the UE 110 in the messaging of operation 6. In operation 8, the UE 110 signals to the eNodeB 107 an ULHandoverPreparationTransfer ( ) message with a 1xRTT message. In operation 9, the eNodeB 107 signals to the MME 191 an UPLINK S1 CDMA2000 TUNNELING message comprising the 1xRTT SID/NID and CDMA2000 SectorID. The eNodeB 107 consequently indicates (operation 10) to the MME the 1xRTT system to which handover is being requested.

In operation 11, the MME 191 routes handover request information to destination system (e.g., part of CDMA2000 SID-A 140-1, or CDMA2000—SID B 140-2, or other CDMA2000 SIDs 140-3) using the 1xRTT SID/NID information and CDMA2000 Sector ID provided by eNodeB. The handover request information includes the 1xRTT message from operation 8. In operation 12, the MME 191 signals to the eNodeB 107 a DOWNLINK S1 CDMA2000 TUNNELING ( ) message, which contains the handover response message from 1xRTT. In operation 13, the eNodeB 107 signals to the UE 110 a MobilityFromEUTRACommand ( ) message. In operation 14, the UE 110 initiates handover signaling with the selected 1xRTT system 146.

Figure 6:
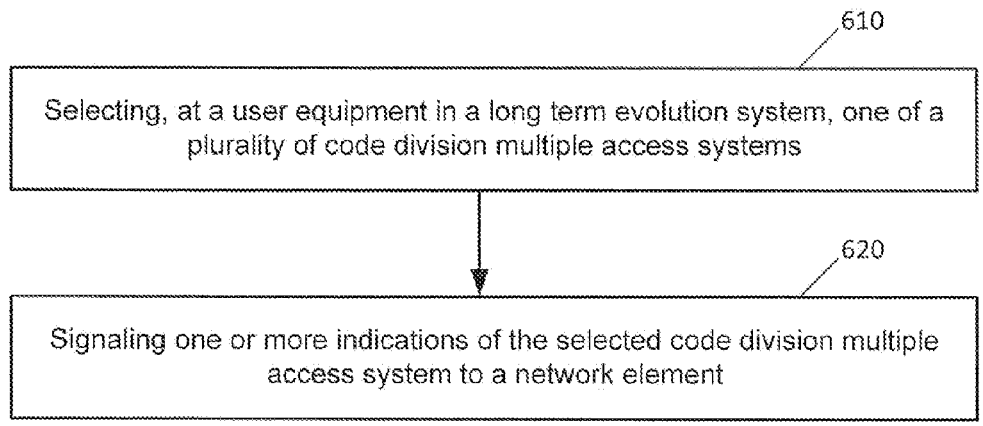
FIGS. 6, 7, and 8 are each logic flow diagrams illustrating the operation of a method, and a result of execution of computer program instructions embodied on a computer readable memory, in accordance with the exemplary embodiments of this invention.
Figure 7:
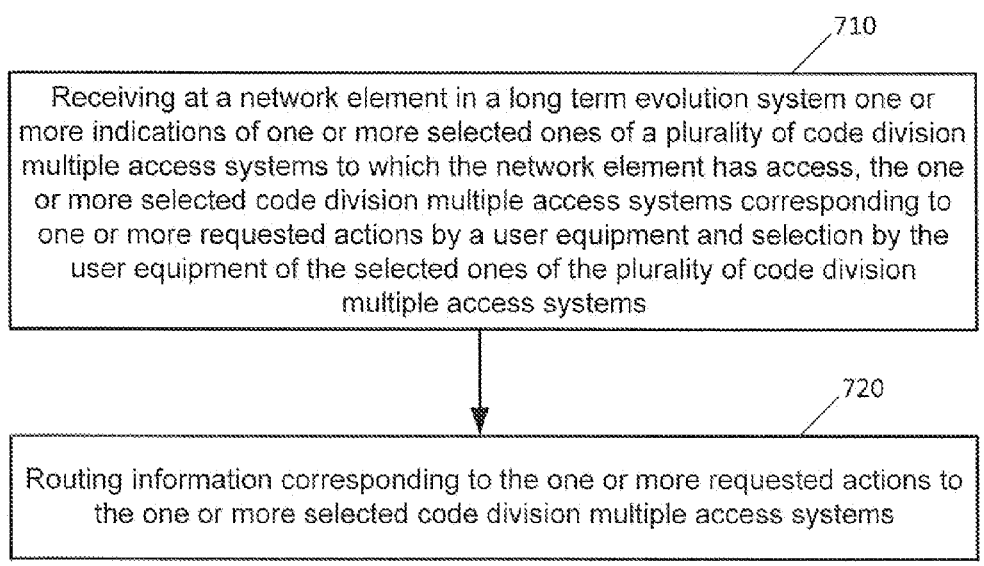
Figure 8:
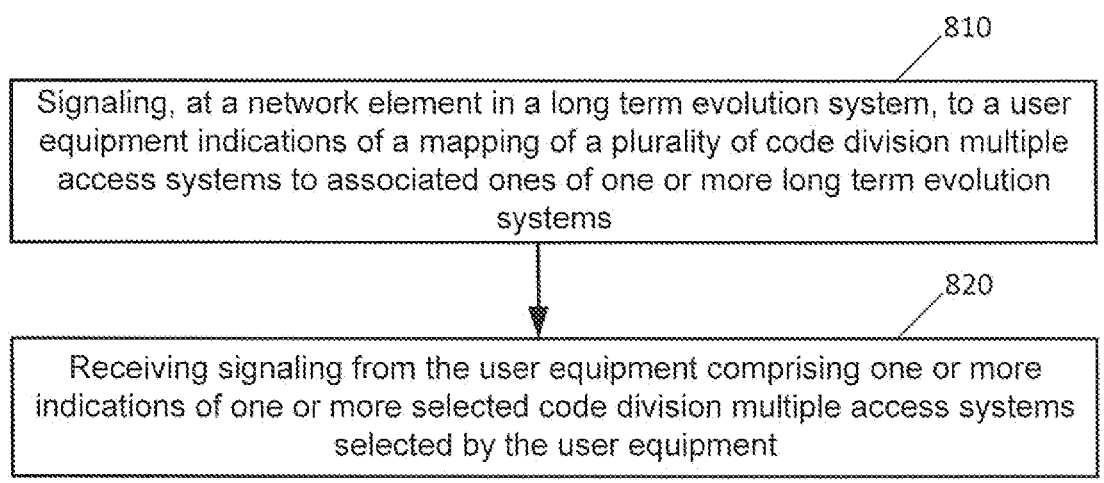

FIGS. 6, 7, and 8 are each logic flow diagrams illustrating the operation of a method, and a result of execution of computer program instructions embodied on a computer readable memory, in accordance with the exemplary embodiments of this invention.

FIG. 6 may be performed by a UE 110. In FIG. 6, the UE 110 selects one of a plurality of code division multiple access systems in block 610. In block 620, the UE 110 signals one or more indications of the selected code division multiple access system to a network element.

FIG. 7 may be performed by a network element such as MME 191 in a long term evolution system. In block 710, the network element receives one or more indications of one or more selected ones of a plurality of code division multiple access systems to which the network element has access. The one or more selected code division multiple access systems correspond to one or more requested actions by a user equipment and selection by the user equipment of the selected ones of the plurality of code division multiple access systems. In block 720, the network element routes information corresponding to the one or more requested actions to the one or more selected code division multiple access systems.

FIG. 8 may be performed by a network element such as eNodeB 107 in a long term evolution system. The network element in block 810 signals to a user equipment indications of a mapping of a plurality of code division multiple access systems to associated ones of one or more long term evolution systems. In block 820, the network element receives signaling from tire user equipment comprising one or more indications of one or more selected code division multiple access systems selected by the user equipment.

The previous disclosure is now illustrated through a number of examples.

Example 1. A method, comprising: selecting, at a user equipment in a long term evolution system, one of a plurality of code division multiple access systems; and signaling one or more indications of the selected code division multiple access system to a network element.

2. The method of example 1, further comprising receiving a mapping of the plurality of code division multiple access systems to associated ones of one or more long term evolution systems, and wherein selecting further comprises selecting one of the plurality of code division multiple access systems using the mapping.

3. The method of example 2, wherein:
the mapping comprises a mapping of a plurality of high rate packet data systems and 1x radio transmission technology systems to the one or more long term evolution systems; selecting further comprises selecting a high rate packet data system and a 1x radio transmission technology system; and signaling further comprises signaling an indication of the selected high rate packet data system and an indication of the selected 1x radio transmission technology system to the network element.

4. The method of example 3, wherein selecting further comprises selecting the selected 1x radio transmission technology system as a circuit switched fallback system, and wherein signaling further comprises signaling an indication of the selected 1x radio transmission system to a base station for purposes of requesting parameters for the selected 1x radio transmission system from the long term evolution system.

5. The method of example 3, further comprising performing, using the long term evolution system, an uplink information transfer of information pertaining to one of the 1x radio transmission technology system or the high rate packet data system, the uplink transfer at least comprising a message indicating which of the 1x radio transmission technology system or the high rate packet data system the information pertains to.

6. The method of example 1, wherein: the plurality of code division multiple access systems further comprise a plurality of high rate packet data systems; selecting further comprises selecting one of the plurality of high rate packet data systems; and signaling further comprises signaling the selected high rate packet data system to a base station in a measurement report.

7. The method of example 6, performed as part of a handover to the selected evolved high rate packet data system.

8. The method of example 6, wherein: the plurality of code division multiple access systems further comprise a plurality of 1x radio transmission technology systems; selecting further comprises selecting one of the plurality of 1x radio transmission technology systems; and signaling further comprises signaling the selected 1x radio transmission technology system to a base station in a measurement report.

9. The method of example 8, performed as part of a handover from the long term evolution system to the selected 1x radio transmission technology system and as part of a concurrent handover to the selected high rate packet data system, and wherein the method further comprises signaling by the user equipment to the base station an extended service request comprising an indication of the selected 1x radio transmission technology system.

10. The method of example 1, wherein: the plurality of code division multiple access systems further comprise a plurality of 1x radio transmission technology systems; selecting further comprises selecting one of the plurality of 1x radio transmission technology systems; and signaling further comprises signaling the selected 1x radio transmission technology system to a base station in a measurement report.

11. The method of example 10, performed as part of a single radio voice call continuity of a voice over Internet protocol call to the selected 1x radio transmission technology system.

12. The method of any one of the previous method examples, performed by a user equipment.

13. A computer program product comprising a computer-readable storage medium bearing computer program code embodied therein for use with a computer, the computer program code comprising code for performing any one of the previous method examples.

14. An apparatus comprising: one or more processors; and one or more memories including computer program code, the one or more memories and the computer program code configured, with the one or more processors, to cause the apparatus to perform any one of the previous method examples.

Example 15. A method, comprising: receiving at a network element in a long term evolution system one or more indications of one or more selected ones of a plurality of code division multiple access systems to which the network element has access, the one or more selected code division multiple access systems corresponding to one or more requested actions by a user equipment and selection by the user equipment of the selected ones of the plurality of code division multiple access systems; and routing information corresponding to the one or more requested actions to the one or more selected code division multiple access systems.

16. The method of example 15, wherein the one or more requested actions comprise a pre-registration procedure with a selected code division multiple access system, and wherein routing further comprises routing information corresponding to the pre-registration procedure to the selected code division multiple access system.

17. The method of example 16, wherein the plurality of code division multiple access systems to which the network element has access further comprises a plurality of 1x radio transmission technology systems and a plurality of high rate packet data systems, and wherein the one or more selected plurality of code division multiple access systems comprises one of a selected 1x radio transmission technology system or a selected high rate packet data system.

18. The method of example 15, wherein the one or more requested actions comprise a handover of the user equipment to a selected code division multiple access system, and wherein routing further comprises routing information corresponding to the handover to the selected code division multiple access system.

19. The method of example 18, wherein the plurality of code division multiple access systems to which the network element has access further comprises a plurality of high rate packet data systems, wherein the one or more selected plurality of code division multiple access systems comprises a selected high rate packet data system, and wherein routing further comprises routing information corresponding to the handover to the selected high rate packet data system.

20. The method of example 15, wherein the plurality of code division multiple access systems to which the network element has access further comprises plurality of 1x radio transmission technology systems, and wherein the one or more requested actions comprise a circuit switched fallback from a long term evolution system to a 1x radio transmission technology system, and wherein routing further comprises routing information corresponding to the circuit switched fallback to the multiple selected code division multiple access system.

21. The method of example 20, wherein the plurality of code division multiple access systems to which the network element has access further comprises a plurality of high rate packet data systems, wherein the one or more requested actions further comprise a handover of a packet data session from the long term evolution system to a selected one of the plurality of high rate packet data systems, and wherein routing further comprises routing to the selected high rate packet data system information corresponding to the handover.

22. The method of example 15, wherein the one or more requested actions comprise a single radio voice call continuity of a voice over Internet protocol call of the user equipment to a selected code division multiple access system, and wherein routing further comprises routing information corresponding to the single radio voice call continuity to the selected code division multiple access system.

23. The method of example 22, wherein the plurality of code division multiple access systems to which the network element has access further comprises a plurality of 1x radio transmission technology systems, and wherein routing further comprises routing information corresponding to the single radio voice call continuity to the selected 1x radio transmission technology systems.

24. The method of any one of the previous method examples, wherein routing information further comprising tunneling the information through, the long term evolution system to the one or more selected code division multiple access systems.

25. The method of any one of the previous method examples, performed by a mobility management entity in the long term evolution system.

26. A computer program product comprising a computer-readable storage medium bearing computer program code embodied therein for use with a computer, the computer program code comprising code for performing any one of the previous method examples.

27. An apparatus comprising: one or more processors; and one or more memories including computer program, code, the one or more memories and the computer program code configured, with the one or more processors, to cause the apparatus to perform any one of the previous method examples.

Example 28. A method, comprising: signaling, at a network element in a long term evolution system, to a user equipment indications of a mapping of a plurality of code division multiple access systems to associated ones of one or more long term evolution systems; and receiving signaling from the user equipment comprising one or more indications of one or more selected code division multiple access systems selected by the user equipment.

29. The method of example 28, further comprising, responsive to the receiving, signaling the one or more indications of the one or more selected code division multiple access systems to a second network element in the long term evolution system.

30. The method of example 29, further comprising receiving signaling corresponding to one or more requested actions by a user equipment and corresponding to the one or more selected code division multiple access systems, and signaling the one or more requested actions to the second network element.

31. The method of example 28, further comprising requesting via signaling the user equipment perform measurements of the one or more selected code division multiple access systems.

32. The method of example 31, wherein the requesting is performed in response to signaling received from a second network element in the long term evolution system comprising an indication of at least a 1x radio transmission technology system, and wherein the requesting via signaling the user equipment perform measurements of the one or more selected code division multiple access systems further comprises requesting via signaling the user equipment perform measurements of the 1x radio transmission technology system.

33. The method of example 25, wherein the one or more signaled indications comprises one or both of an indication of a selected 1x radio transmission technology system and a selected high rate packet data system, and wherein the method further comprises using the indications to select a set of CDMA2000 parameters associated with one or both of the selected 1x radio transmission technology system or the selected high rate packet data system to send to the user equipment, and sending the set of CDMA2000 parameters to the user equipment.

34. The method of any one of the previous method examples, performed by a base station in the long term evolution system.

35. A computer program product comprising a computer-readable storage medium bearing computer program code embodied therein for use with a computer, the computer program code comprising code for performing any one of the previous method examples.

36. An apparatus comprising: one or more processors; and one or more memories including computer program code, the one or more memories and the computer program code configured, with the one or more processors, to cause the apparatus to perform any one of the previous method examples.

Embodiments of the present invention may be implemented in software (executed by one or more processors), hardware (e.g., an application specific integrated circuit), or a combination of software and hardware. In an example embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 1. A computer-readable medium may comprise a computer-readable storage medium (e.g., memory 125, 155, 195 or other device) that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from, the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

What is claimed is:

1. An apparatus, comprising:
one or more processors; and
one or more memories including computer program code,
the one or more memories and the computer program code configured, with the one or more processors, to cause the apparatus to perform at least the following:
receiving, at a user equipment in a long term evolution system, a message from a network element in the long term evolution system, the message at least identifying a mapping between a plurality of public land mobile network (PLMN) identities (IDs) and associated code division multiple access systems for which the long term evolution system supports interworking;
selecting, by the user equipment, one of the plurality of PLMN IDs and a corresponding code division multiple access system based on the mapping between the plurality of PLMN IDs and associated code division multiple access systems in order to handover a call from the long term evolution system; and
transmitting by the user equipment one or more indications of the selected PLMN ID and the corresponding code division multiple access system to the network element in order to handover the call from the long term evolution system.

2. The apparatus of claim 1, wherein:
the mapping comprises a mapping of a plurality of high rate packet data systems and 1x radio transmission technology systems to the one or more long term evolution systems;
the selecting comprises selecting a high rate packet data system and a 1x radio transmission technology system; and
the transmitting comprises signaling an indication of the selected high rate packet data system and an indication of the selected 1x radio transmission technology system to the network element.

3. The apparatus of claim 2, wherein the selecting further comprises selecting the selected 1x radio transmission technology system as a circuit switched fallback system, and wherein the transmitting further comprises signaling an indication of the selected 1x radio transmission system to a base station for purposes of requesting parameters for the selected 1x radio transmission system from the long term evolution system.

4. The apparatus of claim 2, wherein the one or more memories and the computer program code are further configured, with the one or more processors, to cause the apparatus to perform the following: performing, using the long term evolution system, an uplink information transfer of information pertaining to one of the 1x radio transmission technology system or the high rate packet data system, the uplink transfer at least comprising a message indicating which of the 1x radio transmission technology system or the high rate packet data system the information pertains to.

5. The apparatus of claim 1, wherein:
the plurality of PLMN IDs indicates a plurality of high rate packet data systems;
selecting comprises selecting one of the plurality of high rate packet data systems; and
the transmitting comprises signaling the selected high rate packet data system to a base station in a measurement report.

6. The apparatus of claim 5, wherein the handover is to the selected evolved high rate packet data system.

7. The apparatus of claim 5, wherein:
the plurality of PLMN IDs indicates a plurality of 1x radio transmission technology systems;
the selecting further comprises selecting one of the plurality of 1x radio transmission technology systems; and
transmitting further comprises signaling the selected 1x radio transmission technology system to a base station in a measurement report.

8. The apparatus of claim 7, wherein the handover is to the selected 1x radio transmission technology system and as part of a concurrent handover to the selected high rate packet data system, and wherein the one or more memories and the computer program code are further configured, with the one or more processors, to cause the apparatus to perform: signaling by the user equipment to the base station an extended service request comprising an indication of the selected 1x radio transmission technology system.

9. The apparatus of claim 1, wherein:
the plurality of PLMN IDs indicates a plurality of 1x radio transmission technology systems;
the selecting comprises selecting one of the plurality of 1x radio transmission technology systems; and
the transmitting comprises signaling the selected 1x radio transmission technology system to a base station in a measurement report.

10. The apparatus of claim 9, wherein the is of a single radio voice call continuity of a voice over Internet protocol call to the selected 1x radio transmission technology system.

11. An apparatus, comprising:
one or more processors; and
one or more memories including computer program code,
the one or more memories and the computer program code configured, with the one or more processors, to cause the apparatus to perform at least the following:
transmitting a message from a network element in the long term evolution system to a user equipment, the message at least identifying a mapping between a plurality of public land mobile network (PLMN) identities (IDs) and associated code division multiple access systems for which the long term evolution system supports interworking;

receiving at the network element and from the user equipment one or more indications of one or more selected ones of the plurality of PLMN IDs, and corresponding one or more selected code division multiple access systems to which the network element has access based on the mapping between the plurality of PLMN IDs and associated code division multiple access systems, the one or more selected code division multiple access systems corresponding to one or more requested actions by the user equipment and selection by the user equipment of the one or more selected code division multiple access systems in order to handover a call from the long term evolution system; and routing information corresponding to the one or more requested actions to the one or more selected code division multiple access systems in order to handover the call from the long term evolution system.

12. The apparatus of claim 11, wherein the one or more requested actions comprise a pre-registration procedure with a selected code division multiple access system, and wherein the routing further comprises routing information corresponding to the pre-registration procedure to the selected code division multiple access system.

13. The apparatus of claim 11, wherein the plurality of PLMN IDs indicates a plurality of 1x radio transmission technology systems and a plurality of high rate packet data systems, and wherein the one or more selected plurality of code division multiple access systems comprises one of a selected 1x radio transmission technology system or a selected high rate packet data system.

14. An apparatus, comprising:
one or more processors; and
one or more memories including computer program code, the one or more memories and the computer program code configured, with the one or more processors, to cause the apparatus to perform at least the following:
transmitting, by a network element in a long term evolution system, to a user equipment indications of a mapping between a plurality of public land mobile network (PLMN) identities (IDs) and associated code division multiple access systems to ones of one or more long term evolution systems with which the network element is associated, and at least one of the associated one or more long term evolution systems supports interworking with the plurality of code division multiple access systems in order to handover a call from the long term evolution system; and receiving from the user equipment comprising one or more indications of one or more selected public land mobile network (PLMN) identities (IDs) and corresponding one or more code division multiple access systems selected by the user equipment based on the mapping between the plurality of PLMN IDs and associated code division multiple access systems in order to handover the call from the long term evolution system.

15. The apparatus of claim 14, wherein the one or more memories and the computer program code are further configured, with the one or more processors, to cause the apparatus to perform:
receiving signaling corresponding to one or more requested actions by the user equipment and corresponding to the one or more selected code division multiple access systems; and
signaling the one or more requested actions to the second network element.

16. The apparatus of claim 14, wherein the one or more memories and the computer program code are further configured, with the one or more processors, to cause the apparatus to perform: requesting via transmitting the user equipment to perform measurements of the one or more selected code division multiple access systems.

17. The apparatus of claim 16, wherein the requesting is performed in response to signaling received from a second network element in the long term evolution system comprising an indication of at least a 1x radio transmission technology system, and wherein the requesting via transmitting the user equipment to perform measurements of the one or more selected code division multiple access systems further comprises requesting via signaling the user equipment to perform measurements of the 1x radio transmission technology system.

18. The apparatus of claim 14, wherein the one or more signaled indications comprises one or both of an indication of a selected 1x radio transmission technology system and a selected high rate packet data system, and wherein the one or more memories and the computer program code are further configured, with the one or more processors, to cause the apparatus to perform: using the indications to select a set of CDMA2000 parameters associated with one or both of the selected 1x radio transmission technology system or the selected high rate packet data system to send to the user equipment, and sending the set of CDMA2000 parameters to the user equipment.

* * * * *